(12) United States Patent
Sikka et al.

(10) Patent No.: US 8,812,950 B2
(45) Date of Patent: Aug. 19, 2014

(54) SPREADSHEET SOFTWARE SERVICES

(75) Inventors: Vishal Sikka, Los Altos, CA (US); Shai Agassi, Los Gatos, CA (US)

(73) Assignee: SAP AG, Walldorf (DE)

( * ) Notice: Subject to any disclaimer, the term of this patent is extended or adjusted under 35 U.S.C. 154(b) by 1491 days.

(21) Appl. No.: 11/967,704

(22) Filed: Dec. 31, 2007

(65) Prior Publication Data

US 2009/0172553 A1 Jul. 2, 2009

(51) Int. Cl.
*G06F 17/00* (2006.01)
*G06Q 10/10* (2012.01)

(52) U.S. Cl.
CPC ..................................... *G06Q 10/10* (2013.01)
USPC ............................ 715/236; 715/212; 715/240

(58) Field of Classification Search
CPC ............ G06F 17/211; G06F 17/30292; G06F 17/30569; G06F 17/30905
USPC ......... 715/212–220, 234, 235, 239, 200, 236, 715/240
See application file for complete search history.

(56) References Cited

U.S. PATENT DOCUMENTS

| | | | | |
|---|---|---|---|---|
| 5,893,123 | A * | 4/1999 | Tuinenga | 715/209 |
| 5,926,822 | A * | 7/1999 | Garman | 715/201 |
| 6,199,078 | B1 * | 3/2001 | Brittan et al. | 715/234 |
| 6,565,609 | B1 * | 5/2003 | Sorge et al. | 715/234 |
| 6,632,249 | B2 * | 10/2003 | Pollock | 715/207 |
| 6,766,512 | B1 * | 7/2004 | Woloshin et al. | 717/140 |
| 6,988,241 | B1 * | 1/2006 | Guttman et al. | 715/220 |
| 7,007,033 | B1 * | 2/2006 | Rothschiller et al. | 1/1 |
| 7,010,779 | B2 * | 3/2006 | Rubin et al. | 717/106 |
| 7,251,776 | B2 * | 7/2007 | Handsaker et al. | 715/212 |
| 7,640,493 | B2 * | 12/2009 | Collie et al. | 715/234 |
| 7,703,007 | B2 * | 4/2010 | Collie et al. | 715/234 |
| 7,836,425 | B2 * | 11/2010 | Rubin et al. | 717/106 |
| 7,840,889 | B2 * | 11/2010 | Mantuano et al. | 715/212 |
| 2002/0129054 | A1 * | 9/2002 | Ferguson et al. | 707/503 |
| 2003/0110191 | A1 * | 6/2003 | Handsaker et al. | 707/503 |
| 2003/0163585 | A1 * | 8/2003 | Elderon et al. | 709/246 |
| 2003/0226105 | A1 * | 12/2003 | Waldau | 715/503 |
| 2004/0054675 | A1 * | 3/2004 | Li | 707/100 |
| 2004/0181748 | A1 * | 9/2004 | Jamshidi et al. | 715/503 |
| 2005/0081141 | A1 * | 4/2005 | Jonsson | 715/503 |

* cited by examiner

*Primary Examiner* — Stephen Hong
*Assistant Examiner* — Gregory J Vaughn
(74) *Attorney, Agent, or Firm* — Fountainhead Law Group PC

(57) ABSTRACT

Embodiments of the present invention include the creation of spreadsheet software services. In one embodiment, the features and functionality of a spreadsheet may be transformed into a software service, such as a web service, for example. In one embodiment, the present invention includes a method of generating a software service comprising analyzing a spreadsheet to extract an output schema corresponding to at least a portion of the spreadsheet, generating a software service interface description comprising the output schema and the description of the output data, wherein the software service interface is accessible over a network, and accessing the functionality of the spreadsheet using the software service interface description.

20 Claims, 13 Drawing Sheets

ALPHA PRODUCT LINE SALES

| | North America Sales (units) | Europe Sales (units) | Asia Sales (units) | S. America Sales (units) |
|---|---|---|---|---|
| Product 1000 | 100 | 50 | 1050 | 600 |
| Product 1001 | 50 | 100 | 2450 | 100 |
| Product 1002 | 200 | 500 | 3250 | 300 |
| Product 1003 | 250 | 650 | 250 | 350 |
| Product 1004 | 50 | 150 | 750 | 850 |
| Product 1005 | 1000 | 250 | 1050 | 450 |
| Product 1006 | 850 | 450 | 3500 | 900 |
| Product 1007 | 150 | 200 | 250 | 1000 |
| Product 1008 | 750 | 350 | 100 | 250 |
| Product 1009 | 900 | 400 | 350 | 50 |
| Product 1010 | 100 | 100 | 950 | 650 |
| Total Sales (Units) | 4400 _921_ | 3200 _922_ | 13950 _923_ | 5500 _924_ |
| Revenue | $11,000.00 _931_ | $8,000.00 _932_ | $34,875.00 _933_ | $13,750.00 _934_ |
| Total Revenue | $67,625.00 _911_ | | | |

SPREADSHEET SOFTWARE SERVICES

BACKGROUND

The present invention relates to spreadsheets for computer programs, and in particular, to spreadsheets that are available as software services.

Spreadsheets are a computer program application that may be used for data analysis. Common spreadsheet programs include Excel® by Microsoft® Corp. or Lotus® from IBM® Corp., for example. In a spreadsheet program, a user is presented with an array of cells (columns and rows). A user may enter data into one or more cells, and program other cells to be functionally related to the cells containing data. For example, a column of cells may include data indicating the cost of manufacturing a product, and data in each row may represent the cost of manufacturing a particular product (e.g., in dollars). Another cell in the spreadsheet may be programmed to calculate and display the sum of the values in the column to show the total cost of manufacturing all the products. Spreadsheet programs include a wide range of programming options and functions, and a single spreadsheet may include many pages (or sheets) with a variety of data or calculated data. Accordingly, complex spreadsheets may be created to flexibly meet the data analysis needs of individual users. Additional spreadsheet functionality includes generating graphical images such as charts or graphs to illustrate trends or relationships between the data, defining "macros" to perform data calculations, and linking the inputs of cells to programming code (e.g., Visual Basic Code) to implement user programmed functionality.

While spreadsheets represent a powerful mechanism for allowing users to analyze data, one problem associated with spreadsheets is that the spreadsheet files are typically generated and stored using a resident software program, such as Excel®. For example, users typically create new spreadsheets on their local personal computer. The result is that an organization may possess large volumes of data analysis that may not be reusable across users. FIG. 1 illustrates some example spreadsheets that may be created in an organization. In this example, the organization may include three (3) business units ("Business Unit A", "Business Unit B", "Business Unit C"), a finance department, a sales department, and a manufacturing facility. Each unit of the organization may include personnel who generate numerous spreadsheets to analyze data relevant to their part of the organization. In particular, Business Unit A may include N spreadsheets 101 (where N is a number of spreadsheets) including data and functionality specific to Business Unit A. Similarly, Business Unit B may include I spreadsheets 103 (where I represents the number of spreadsheets) including data and functionality specific to Business Unit B. Likewise, Business Unit C and the Finance, Sales, and Manufacturing Departments may each include numerous spreadsheets 105, 102, 104, and 106, respectively, tailored to analyze data relevant to these organizational units. However, accessing and using the numerous spreadsheets across the organization can be extremely difficult to manage using existing spreadsheet technology. While some mechanisms for sharing spreadsheets across networks exist (e.g., Excel® sharing features), such solutions are typically integrated tightly with the underlying spreadsheet program and may have limited use outside such program.

Thus, there is a need for improved techniques for sharing the features and functions in spreadsheets. The present invention solves these and other problems by providing spreadsheet software services.

SUMMARY

Embodiments of the present invention include the creation of spreadsheet software services. In one embodiment, the features and functionality of a spreadsheet may be transformed into a software service, such as a web service, for example. In one embodiment, the present invention includes a method of generating a software service comprising analyzing a spreadsheet to extract an output schema corresponding to at least a portion of the spreadsheet, generating a software service interface description comprising the output schema and the description of the output data, wherein the software service interface is accessible over a network, and accessing the functionality of the spreadsheet using the software service interface description.

The following detailed description and accompanying drawings provide a better understanding of the nature and advantages of the present invention.

BRIEF DESCRIPTION OF THE DRAWINGS

FIG. 9 is an example Excel® spreadsheet that may be converted to a spreadsheet software service according to another embodiment of the present invention.

DETAILED DESCRIPTION

Described herein are techniques for spreadsheet software services. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
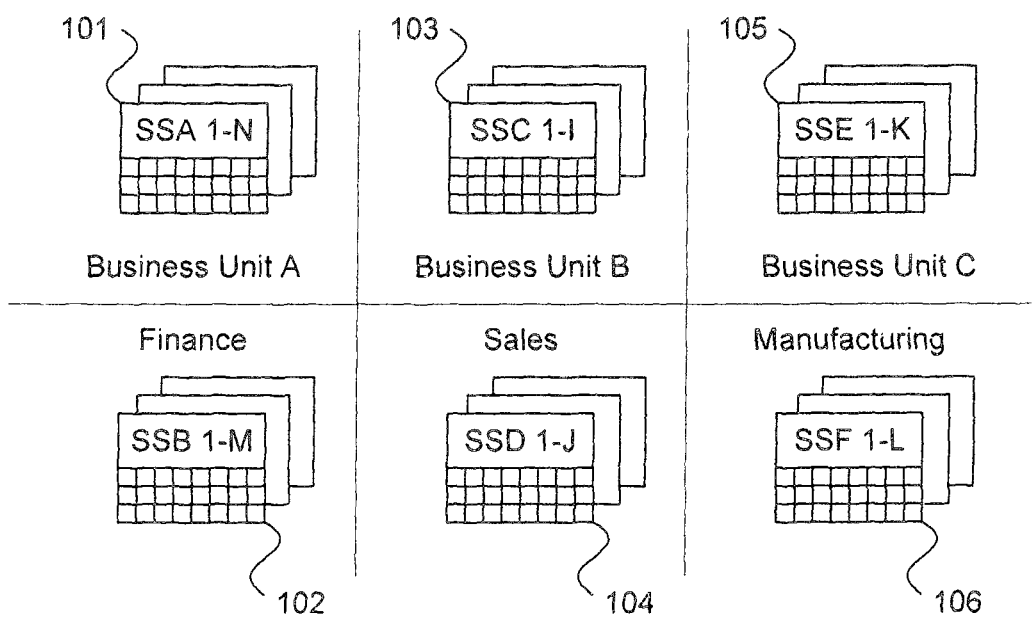
FIG. 1 illustrates some example spreadsheets that may be created in an organization.
Figure 2A:
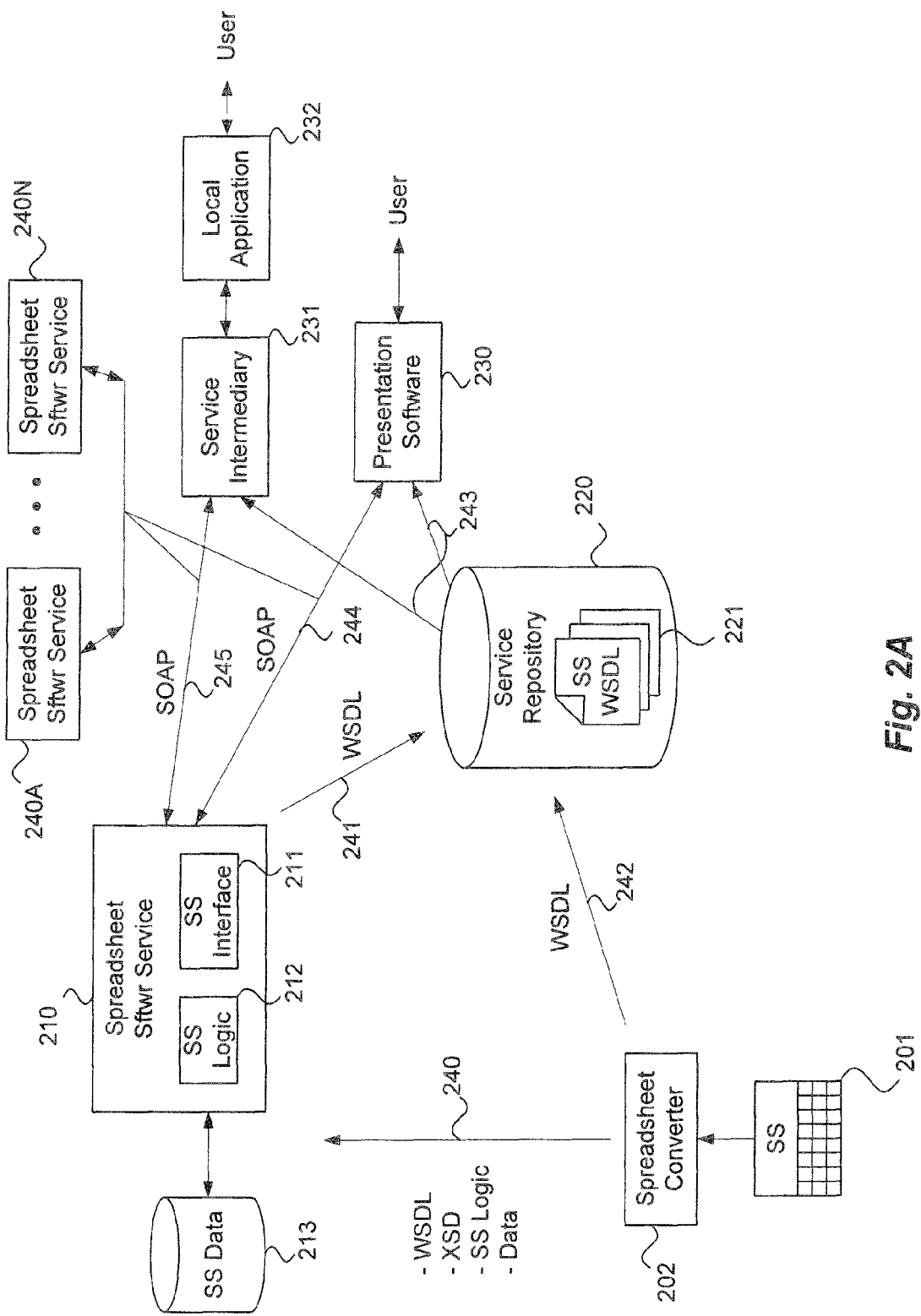
FIG. 2A is an example of spreadsheet software services according to one embodiment of the present invention.

FIG. 2A is an example of spreadsheet software services according to one embodiment of the present invention. In this example, a spreadsheet 201 may be converted into a spreadsheet software service 210, which may be accessed by a variety of systems or users using a service interface. In this example, a spreadsheet converter 202 accesses spreadsheet 201. Converter 202 may analyze the spreadsheet and generate schema information from the spreadsheet to describe the way data is stored in the spreadsheet. Additionally, the raw data from the spreadsheet may be extracted and forwarded to the spreadsheet service. Furthermore, converter 202 may extract the programmed spreadsheet functionality or "logic" ("SS Logic"), such as functions, macros, or embedded programs (e.g., VBScripts). Converter 202 may be a local program, a program operating on a remote system such as a server, or a web based program such as a web service, for example. Schema information from the spreadsheet may be used to configure and store the data from the spreadsheet in a database 213, which may be accessed from spreadsheet service 210. Schema information may also be used to generate service descriptions and associated schema definitions. In this example, spreadsheet converter 202 may analyze the spreadsheet 201 and output a Web Service Description Language ("WSDL") document and an XML Schema ("XSD") for describing how to access spreadsheet service 210. In one embodiment, the WSDL document may include the XSD information. In other embodiments, the WSDL and XSD are separate and the WSDL incorporates the XSD using an "import" statement, for example. The WSDL, XSD, SS Logic, and data may be sent to a host system at 240 and made available on a network, for example, as a stand-alone software service including some or all of the functionality of the spreadsheet.

Spreadsheet software services 210 according to embodiments of the present invention may comprise a spreadsheet interface ("SS Interface") 211, spreadsheet logic ("SS Logic") 212, and spreadsheet data ("SS Data") 213 extracted from one or more spreadsheets. SS Data 213 may include some or all of the data from spreadsheet 201. In one example embodiment, the spreadsheet service 210 may be a software service frame (e.g., software for linking and tying together the service interfaces, logic, and data) to which logic and service interfaces are added as spreadsheets are converted, for example. The data may be configured in database 213 according to schema information extracted from the spreadsheet. For example, data may be stored in database tables in the same or equivalent way as the data is stored in the spreadsheet. Additionally, metadata descriptions of the data (e.g., column and row descriptions) may be extracted and used to configure the database. In one embodiment, only raw data is stored in the database. For example, a spreadsheet may include some cells containing raw data and other cells that contain data values derived from the raw data cells (e.g., using programmed functions). As described in more detail below, the raw data may be stored in the database 213 and the schema for the raw data cells may be used as an input schema for the spreadsheet service so that the service may receive unprocessed data in a message and use the logic extracted from the spreadsheet to process the data and output results. Similarly, one or more schemas for the calculated (or derived) cells may be used as an output schema and provide the calculated results as outputs. Accordingly, the spreadsheet service may be used either to access data derived from the raw data in the original spreadsheet (e.g., total cost of sales based on the raw sales data in the original spreadsheet), or the spreadsheet service may be used to process new data sets using the logic extracted from the original spreadsheet (e.g., total cost of sales based on new data supplied from a user).

Spreadsheet software service 210 ("SS Service") may be accessed through the spreadsheet interface 211 generated by converter 202. In one embodiment, the system hosting the spreadsheet service may forward the WSDL document for the spreadsheet service 210 to a service repository 220 as shown at 241. Service repository 220 may be located on a remote system or integrated with the software service, for example. The WSDL document describes the service, including the service interface 211 for using the spreadsheet service's functionality. As illustrated at 242, in another embodiment the WSDL document may be sent to service repository 220 by the spreadsheet converter 202 after the converter analyzes the spreadsheet and determines the spreadsheet's schema and logic. Service repository 220 may store WSDL documents 221 describing numerous services 240A-240N derived from one or multiple spreadsheets. Accordingly, the functionality of any spreadsheet service may be accessed by accessing the WSDL document for the spreadsheet.

As described in more detail below, the WSDL documents may be used to describe a variety of attributes about the spreadsheet service as derived from a spreadsheet by converter 202. For example, the WSDL document information may include a description of the entity responsible for the spreadsheet and the spreadsheet service (e.g., the business, business unit, department, or individual who created the spreadsheet), the functions the spreadsheet and SS service can perform, the interface model, and the technology required for performing a transaction, for example. In this example, a user may access the spreadsheet service using presentation software 230 or a local application 232. Here, the presentation software 230 may access the WSDL document for the spreadsheet service from service repository 220, as illustrated at 243, and generate SOAP or equivalent messages (e.g., remote function calls ("RFC") or Internet Inter-Orb Protocol ("IIOP")) conforming to the interface 211 based on the retrieved WSDL. Alternatively, the local application 232 may interact with the software service through service intermediary 231. Service intermediary 231 may be a software component used to bridge local application 232 with the WSDL access and SOAP service protocols used to access spreadsheet service 210, for example. SOAP or equivalent messages conforming to the spreadsheet service's interface may be sent to and received from the spreadsheet service 210 to access the service's logic 212 and data 213 as illustrated at 244 and 245. As described in more detail below, the spreadsheet service 210 may be used to access a variety of features and functions derived from the spreadsheet 201, and may further be used in ways not supported by a stand-alone spreadsheet.

Figure 2B:
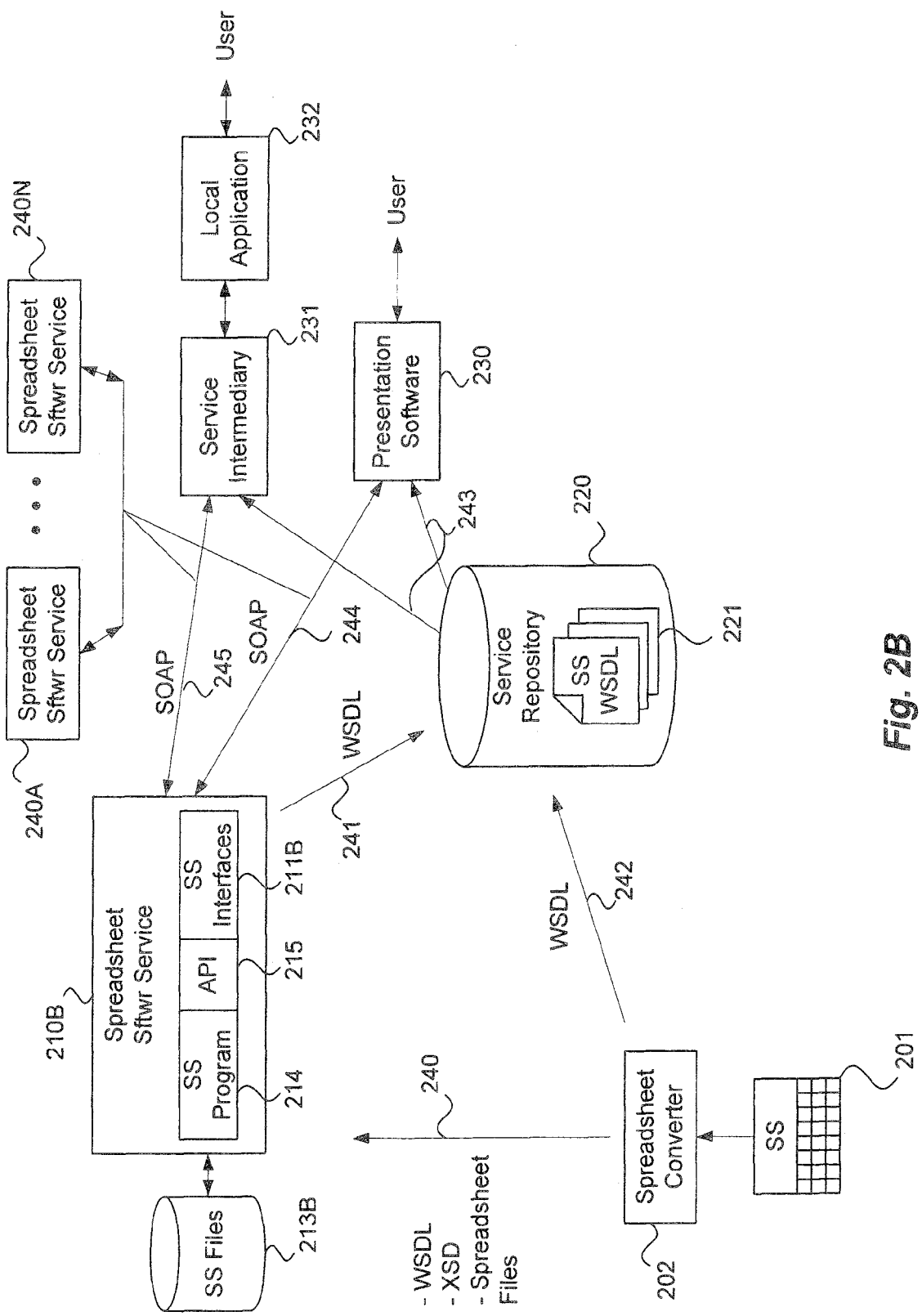
FIG. 2B is an example of spreadsheet software services according to another embodiment of the present invention.

FIG. 2B is an example of spreadsheet software services according to another embodiment of the present invention. In this example, the spreadsheet service 210B implements the functionality of a spreadsheet by accessing the spreadsheet file itself (e.g., an Excel® .xls file). For example, spreadsheet files or references to the spreadsheet files (e.g., links or pointers) may be stored in repository 213B, which may be any form of storage including a database, document management system, or file management system, for example, for storing spreadsheet files or references to files. Spreadsheet service 210B includes a spreadsheet service interface ("SS Interface") 211B, spreadsheet program 214 (e.g., Excel® or Lotus®), and an application program interface ("API") layer 215 for establishing communication between the spreadsheet service interface 211B and the spreadsheet program 214. API layer 215 may include code for converting SOAP messages into spreadsheet program interface calls and code for converting spreadsheet program outputs into SOAP messages, for example. While the SS Interface 211B and API layer 215 are shown here as separate layers for illustration, it is to be understood that these two elements may form a signal code layer for interfacing between the service protocols (e.g., SOAP) and an Excel® program, for example. Alternatively, the spreadsheet files or the spreadsheet program, or both, may be stored external to the spreadsheet service 210B and accessed through a link or pointer. For example, rather than storing the spreadsheet files 201 in a repository 213B local to spreadsheet service 210B, the spreadsheet service 210B may include links to the particular spreadsheet files. Accordingly, the spreadsheets may be maintained on the spreadsheet developer's computer for further development or manipulation or the spreadsheets may be maintained in a local network directory for a particular group responsible for the spreadsheets.

Figure 3:
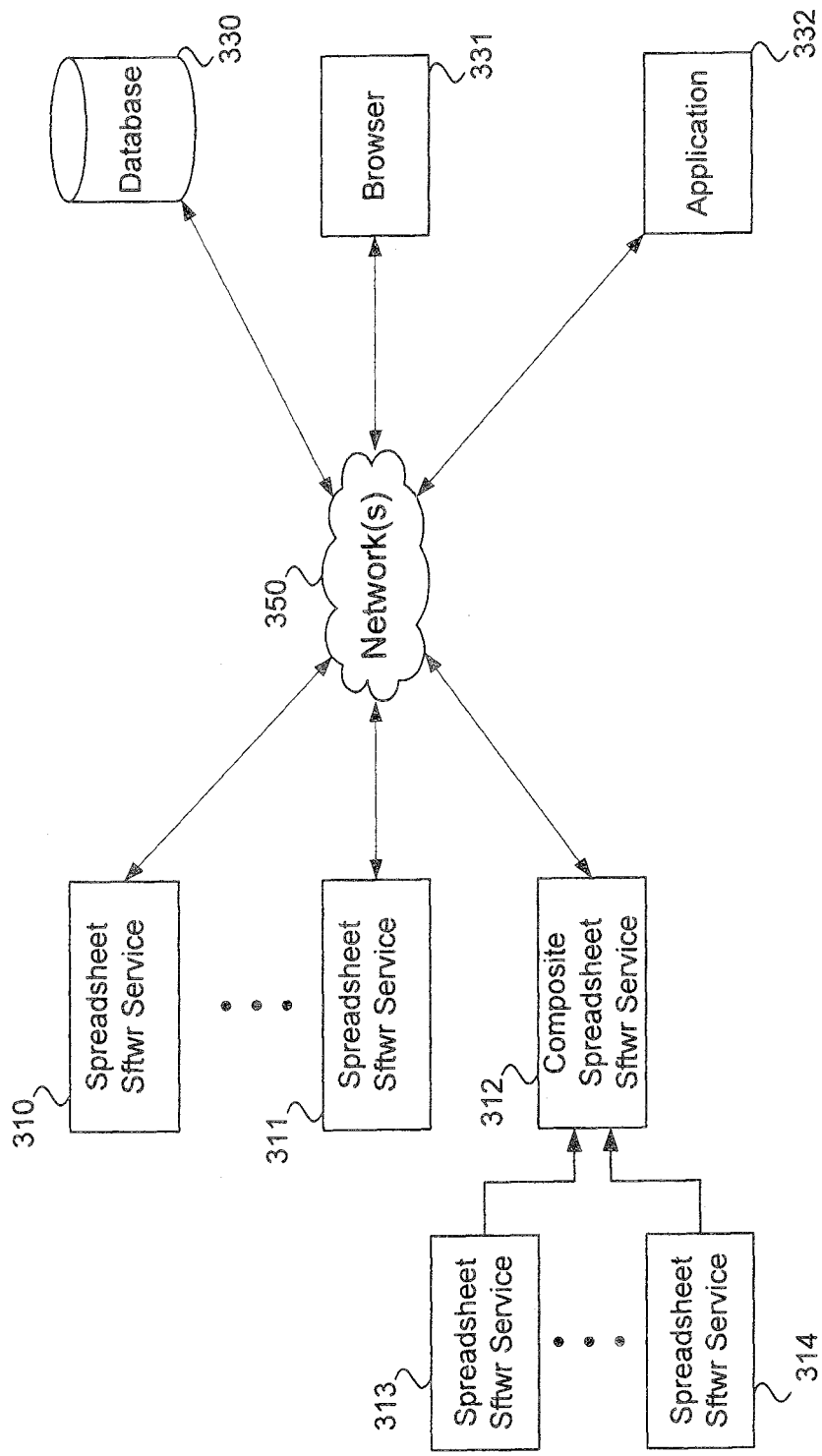
FIG. 3 illustrates accessing spreadsheet software services according to another embodiment of the present invention.

FIG. 3 illustrates accessing spreadsheet software services according to another embodiment of the present invention. Once a spreadsheet has been converted into a spreadsheet service, the features and functionality of the spreadsheet may be accessed and used by a variety of software systems. For example, a user may access the information in a spreadsheet through a browser 331. As illustrated in FIG. 3, browser 331 may interface with multiple spreadsheet services 310, 311, and 312 over a network 350. Network 350 may be any type of communication network including, but not limited to, a local area network, wide area network, wireless network, an ad-hoc network, an Intranet, or the Internet, for example. Additionally, an application 332 may be configured to access the features and functionality of one or more spreadsheet services. As discussed in more detail below, an application configured with a business process may use the data, the functionality, or both, as part of a larger integrated data processing algorithm. Similarly, a database 330 may access the features and functionality of one or more spreadsheet services. For example, calculated results from a spreadsheet may be accessed and stored in a database. Additionally, a database may use the programmed functionality in one or more spreadsheet services to perform data calculations (e.g., stored procedures) and populate or update objects/tables in the database.

FIG. 3 further illustrates another feature of some embodiments of the present invention. Once a spreadsheet has been converted into a spreadsheet service, composite services may be defined to provide enhanced features and functionality. For example, the features and functions of spreadsheet service 313 and spreadsheet service 314 may be accessed using a composite spreadsheet service 312.

Figure 4A:
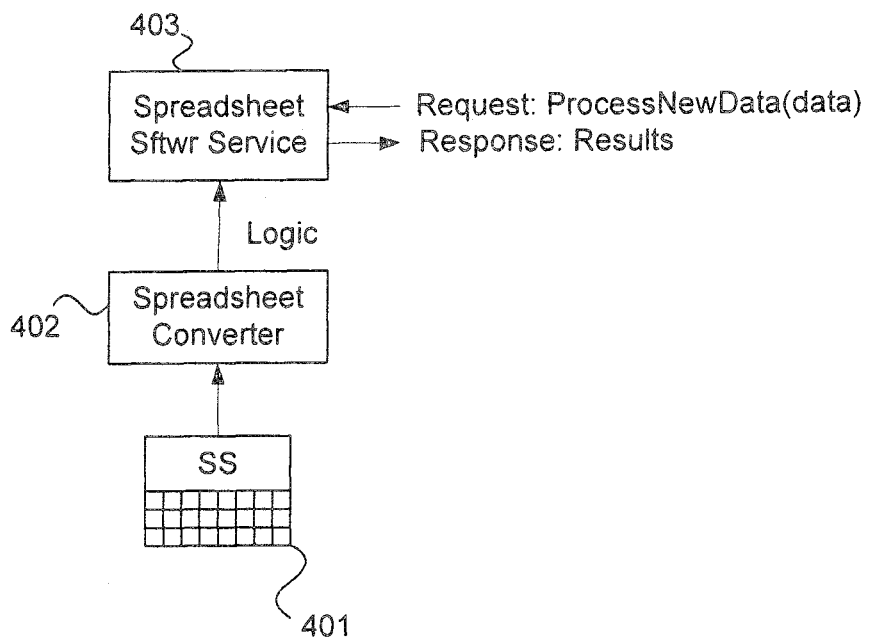
FIGS. 4A-B illustrate the use of spreadsheet software services according to different embodiments of the present invention.
Figure 4B:
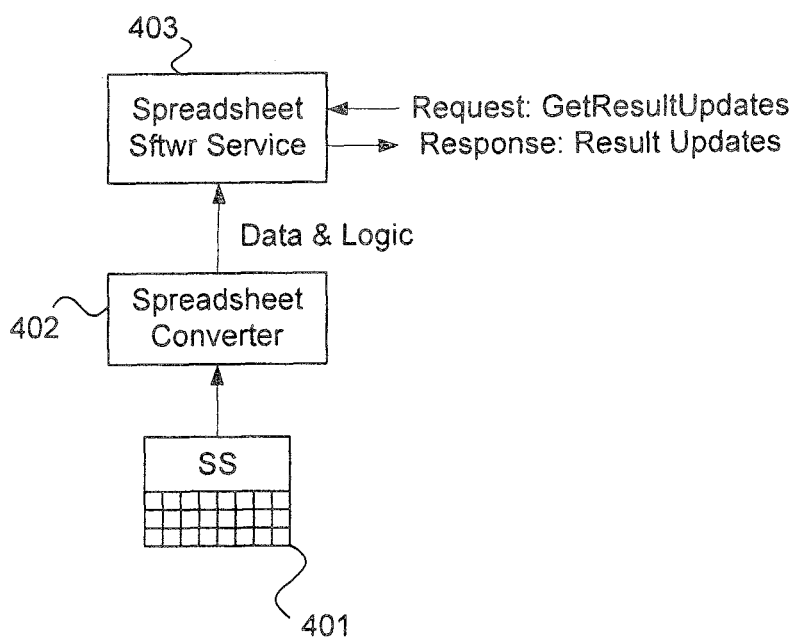

FIGS. 4A-B illustrate the use of spreadsheet software services according to different embodiments of the present invention. As illustrated in FIG. 4A, the logic from a spreadsheet 401 may be used to process different data than found in the original spreadsheet. For example, spreadsheet converter 402 may extract logic from spreadsheet 401 for use in spreadsheet service 403. The spreadsheet service 403 may receive a request message to process new data (e.g., in a SOAP message). The data may be received in the software service 403, processed using the logic from spreadsheet 401, and the results may be returned to the system initiating the request in a response message, for example. Alternatively, as illustrated in FIG. 4B, the data and logic from a spreadsheet 401 may be used to provide the information from the original spreadsheet to other systems. For example, spreadsheet converter 402 may extract data and logic from spreadsheet 401 for use in spreadsheet service 403. The spreadsheet service 403 may receive a request message to get certain results from the spreadsheet. For example, a system or user may subscribe to the spreadsheet service so that as data in the spreadsheet is updated by the owner of the spreadsheet, the updated results are provided to the service and sent to the subscriber automatically in a response message, for example. Any of the calculated cells of a spreadsheet may be made available as outputs of the service alone or as combinations, and other systems or users may obtain the outputs by specifying the desired information in the messages provided to the service.

Figure 5:
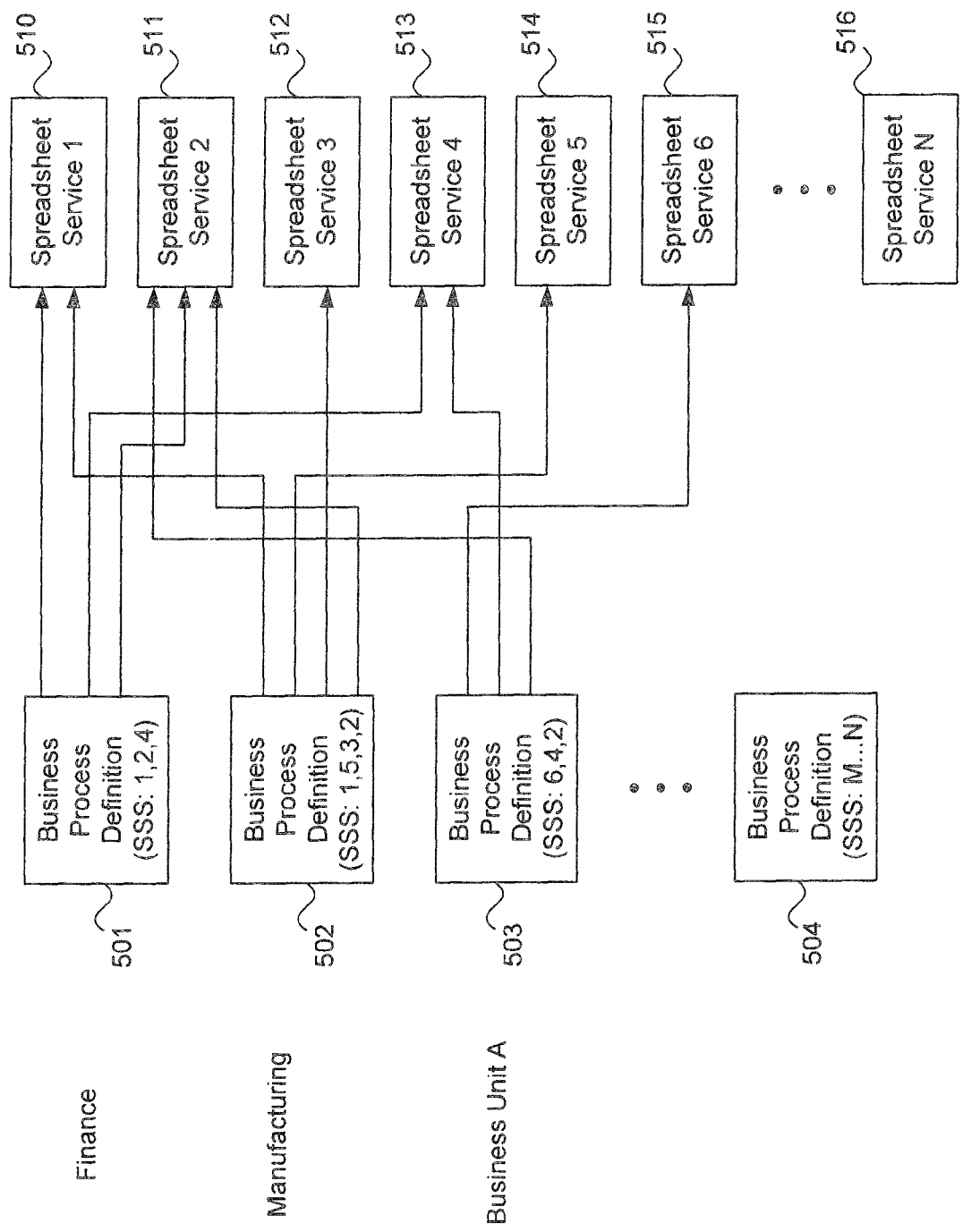
FIG. 5 illustrates combining spreadsheet software services in business processes according to another embodiment of the present invention.

FIG. 5 illustrates combining spreadsheet software services in business processes according to another embodiment of the present invention. As mentioned above, since spreadsheets are typically created and used by individuals on resident software programs such as Excel®, it is difficult to integrate the information in such spreadsheets across broader organizational processes. One advantage of some embodiments of the present invention includes the ability to convert spreadsheet features and functions into spreadsheet services and use some or all of the features and functions of multiple services together as part of a larger process. For example, FIG. 5 illustrates multiple spreadsheet services 510-516. Each spreadsheet service may include data and functionality derived from one or more isolated spreadsheets. However, according to some embodiments of the present invention, multiple spreadsheet services are integrated together as part of a single business process by specifying particular spreadsheet services in a business process definition. For example, the Finance department of an organization may specify a business process definition 501 using a business process definition language ("BPEL"), for example. The BPEL specification may use spreadsheet service 510 ("SSS 1"), spreadsheet service 511 ("SSS 2"), and spreadsheet service 513 ("SSS 4"). Since the original spreadsheet has been converted into a spreadsheet software service, a business process definition may use the features of multiple spreadsheets in combination with any other services or software functionality available through a business process definition. Similarly, a Manufacturing department of the same organization may specify a business process definition 502. The BPEL specification may use spreadsheet service 510 ("SSS 1"), spreadsheet service 514 ("SSS 5"), spreadsheet service 512 ("SSS 3"), and spreadsheet service 511 ("SSS 2"). Likewise, a Business Unit of the organization (e.g., "Business Unit A") may specify a business process definition 503. The BPEL specification may use spreadsheet service 515 ("SSS 6"), spreadsheet service 513 ("SSS 4"), and spreadsheet service 511 ("SSS 2"). Each of the business process definitions may further integrate the features and functions of other software services into the business process. Additionally, the original spreadsheets used to derive the spreadsheet services may be created and maintained by any organization unit, which allows different units to leverage off the work done by individuals in different units of the organization.

Figure 6:
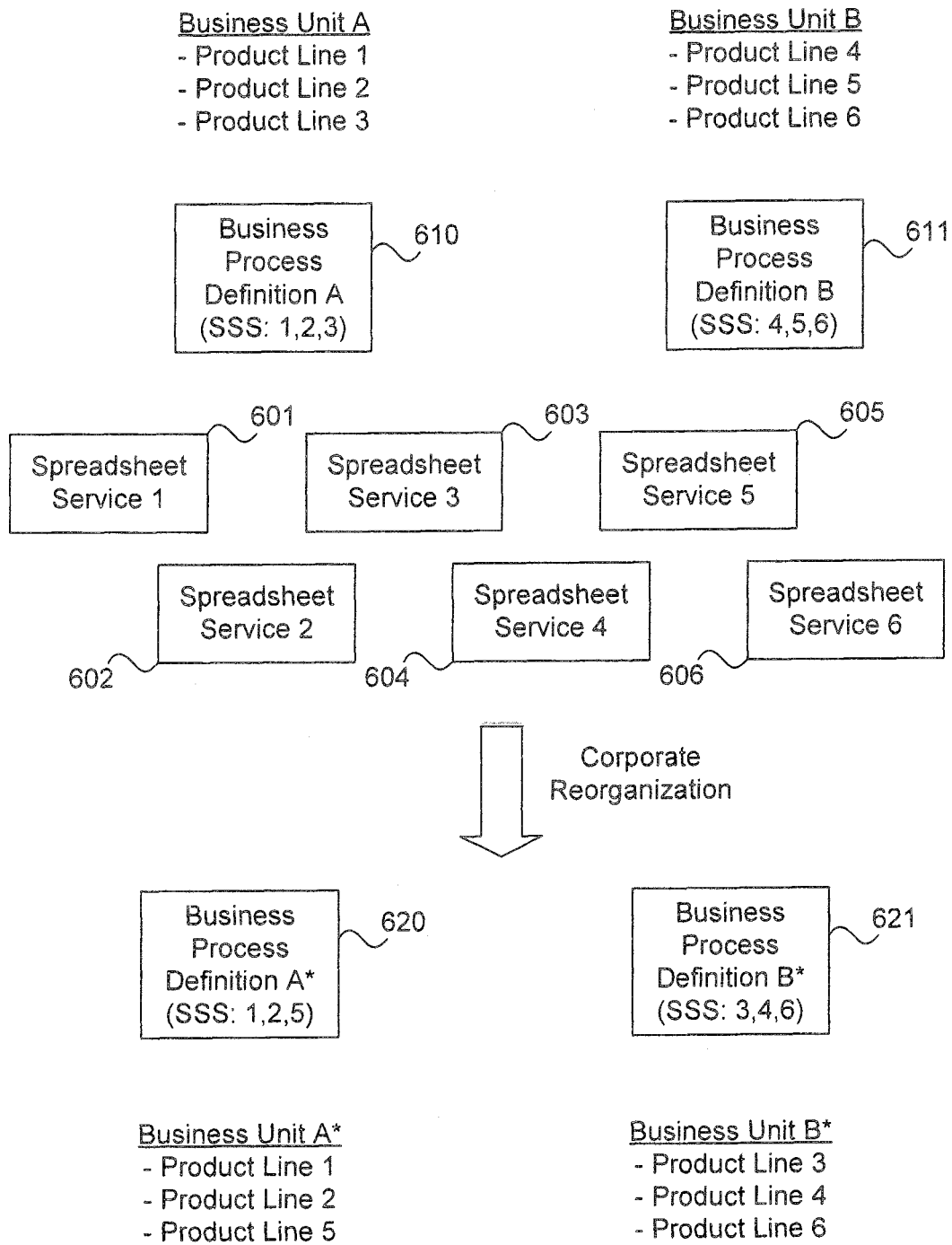
FIG. 6 illustrates business processes using spreadsheet software services according to another embodiment of the present invention.

FIG. 6 illustrates business processes using spreadsheet software services according to another embodiment of the present invention. This example illustrates one advantage of spreadsheet software services in the context of a business. Here, Business Unit A includes product lines 1, 2, and 3. Similarly, Business Unit B includes product lines 4, 5, and 6. Each product line may include numerous individual products that each have associated costs, sales, schedules, or a variety of other associated information. Personnel in each business unit may generate numerous spreadsheets to manage the product lines. For example, each product line may have an associated spreadsheet including a variety of functionality. If the spreadsheets are converted into spreadsheet services, business processes may be defined in each business unit to use the spreadsheet information. FIG. 6 illustrates spreadsheet services 601-606. Spreadsheet services 1-3 may be derived from spreadsheets with information about product lines 1-3. Similarly, spreadsheet services 4-7 may be derived from spreadsheets with information about product lines 4-6. Accordingly, Business Unit A may develop a business process definition 610 for accessing spreadsheet services 1-3, and Business Unit B may develop a business process definition 611 for accessing spreadsheet services 4-6. Advantageously, if a corporate reorganization occurs that moves product lines between business units, the spreadsheet services may remain unchanged, and the new business units may simply modify their business process definitions. For example, reorganized Business Unit A* may now include product lines 1, 2, and 5. Therefore, Business Unit A* may have a correspondingly modified business process definition 620 that specifies spreadsheet services 1, 2, and 5. Similarly, reorganized Business Unit B* may now include product lines 3, 4, and 6. Therefore, Business Unit B* may have a correspondingly modified business process definition 621 that specifies spreadsheet services 3, 4, and 6. This simplified example illustrates the flexibility and reusability achieved by converting isolated spreadsheets into spreadsheet services.

Figure 7A:
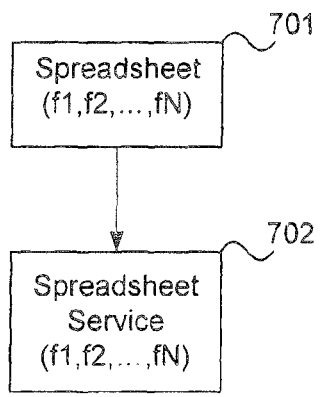
FIGS. 7A-B illustrate converting spreadsheets into software services according to different embodiments of the present invention.
Figure 7A:
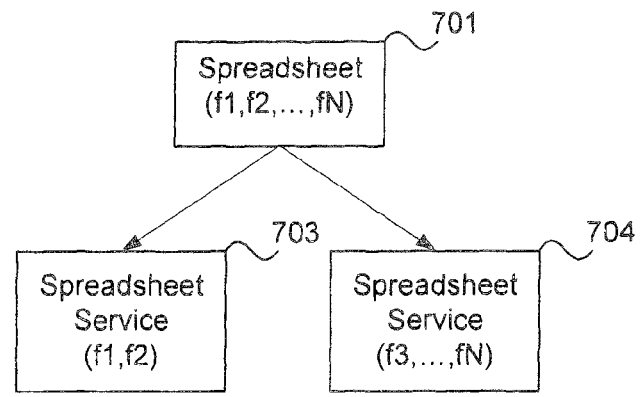
Figure 7A:
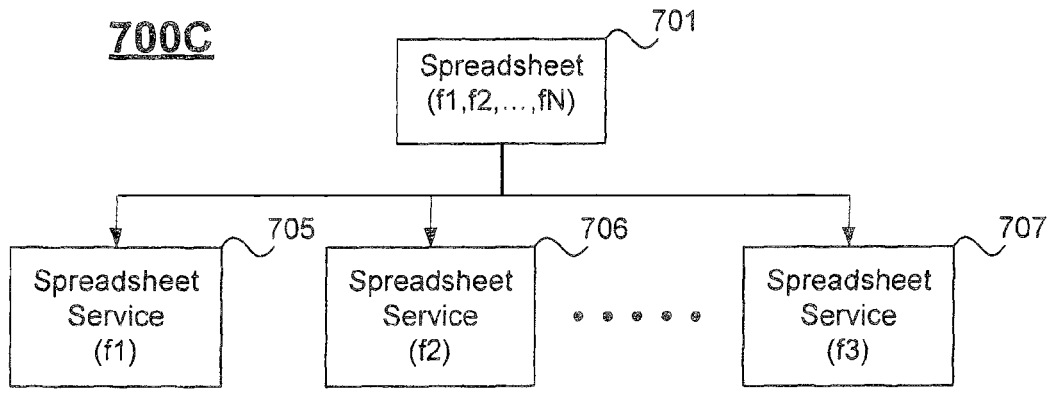
Figure 7B:
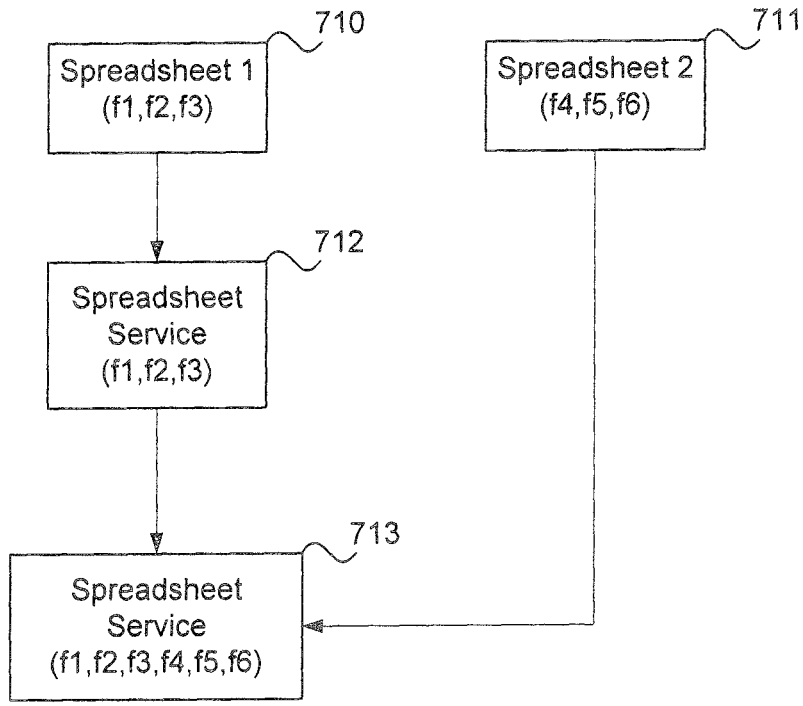
Figure 7B:
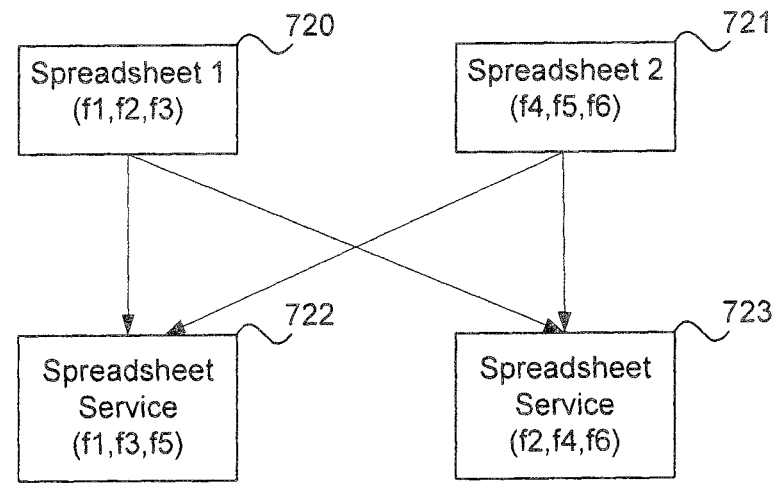

FIGS. 7A-B illustrate converting spreadsheets into software services according to different embodiments of the present invention. As mentioned above, spreadsheets may include a variety of functionality. As illustrated at FIGS. 7A-B, the functionality of one or more spreadsheets may be converted into one or more spreadsheet software services in multiple different ways. For example, 700A illustrates a spreadsheet 701 comprising a plurality of functions f1, f2, ..., fN, where N is some integer. The functions may be any of the programming features in the spreadsheet including functions to derive cell values from raw data values, charts or graphs, macros, or embedded programs such as Visual Basic, for example. This example illustrates the simple situation where all of the functions available in spreadsheet, or a subset of such functions, are converted into a single spreadsheet service 702. Accordingly, some or all of the features and functions programmed into spreadsheet 701 are accessible through SS service 702 using the appropriate messaging. 700A illustrates that the features and functions of spreadsheet 701 may be grouped and partitioned into two or more spreadsheet services 703 and 704. This approach may be used where certain functions of a spreadsheet pertain to one aspect of a business (e.g., overhead or costs) and other functions of the spreadsheet pertain to another aspect of the business (e.g., sales). For example, a senior sales executive may access multiple spreadsheet services pertaining to sales that were generated from sales pages of multiple spreadsheets throughout a company to obtain a "roll up" of sales data. 700C illustrates that each function in spreadsheet 701 may be broken out as a separate spreadsheet service 705-707. A high level of granularity in each spreadsheet service may provide users with an increased level of available options for combining each spreadsheet service with other services, for example.

Another advantage of spreadsheet services includes extensibility. For example, as illustrated in FIG. 7B at 700D, a spreadsheet 710 may be used to generate a spreadsheet service 712, and spreadsheet service 712 may be extended to include yet more functionality. In this example, spreadsheet 710 ("Spreadsheet 1") includes the functions f1, f2, and f3. When spreadsheet 710 is converted to a spreadsheet service 712, the spreadsheet service 712 supports functions f1, f2, and f3 via message handling. Another spreadsheet ("Spreadsheet 2") 711 includes functions f4, f5, and f6. Because spreadsheet software services are extensible, spreadsheet 711 may be converted and integrated into spreadsheet service 712 to create a spreadsheet service 713 that includes functions f1, f2, f3, f4, f5, and f6. This may be achieved by amending the existing WSDL and XSD documents to include the additional functionality and supplementing the service interface, for example.

FIG. 7B further illustrates the scenario where functions from multiple different spreadsheets are grouped together in different spreadsheet services. In this example, spreadsheet 720 includes functions f1, f2, and f3 and spreadsheet 721 includes function f4, f5, and f6. Spreadsheet service 722 may include functions from spreadsheet 720 (e.g., f1, f3) and other functions from spreadsheet 721 (e.g., f5). Similarly, spreadsheet service 723 may include functions from spreadsheet 720 (e.g., f2) and other functions from spreadsheet 721 (e.g., f4, f6). Embodiments of the present invention may provide a user interface to allow a user to select cells or other function outputs of a spreadsheet and associate them with different spreadsheet software services, for example.

Figure 8A:
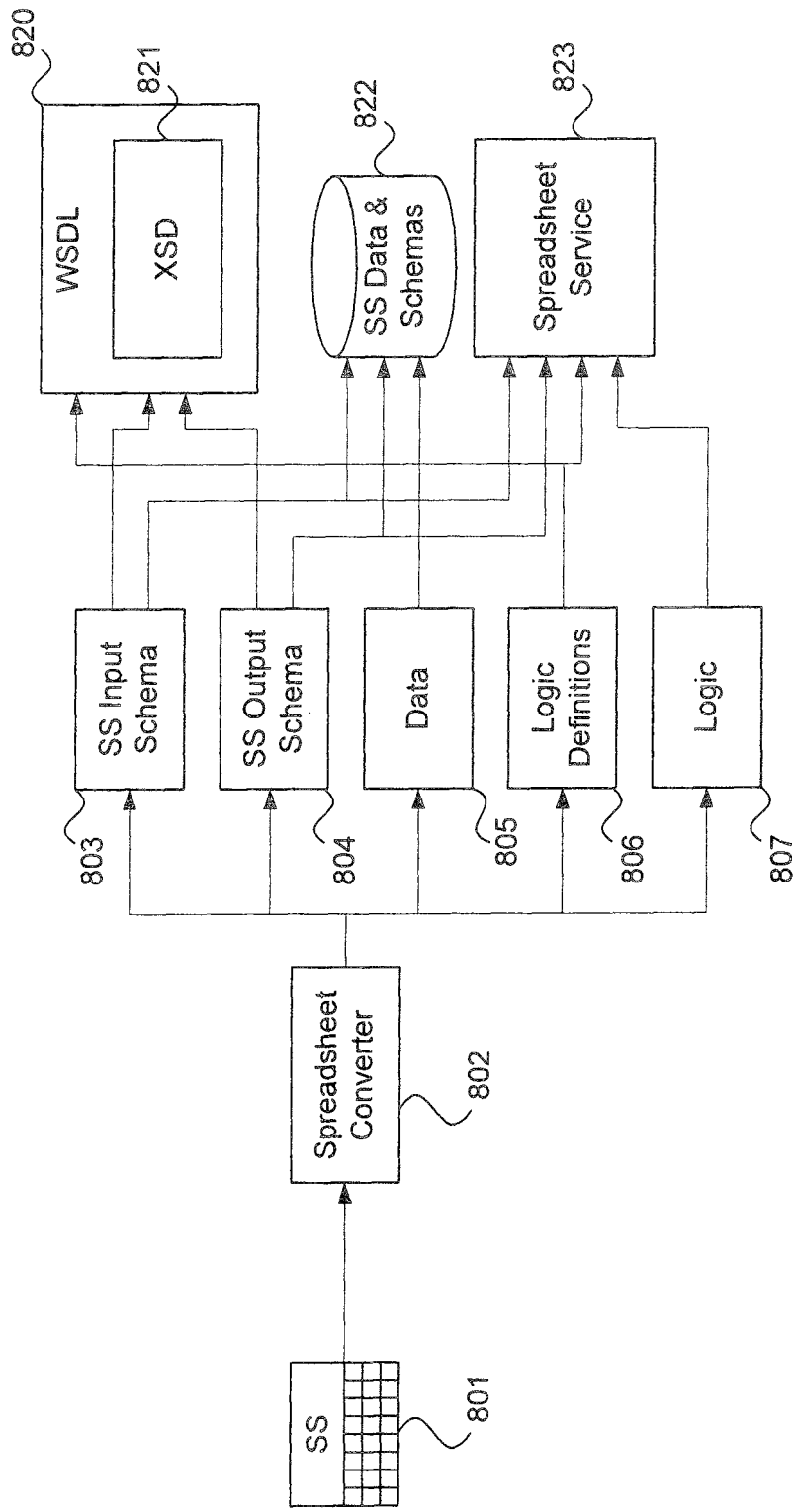
FIGS. 8A-B illustrate software constructs used to create spreadsheet services according to different embodiments of the present invention.
Figure 8B:
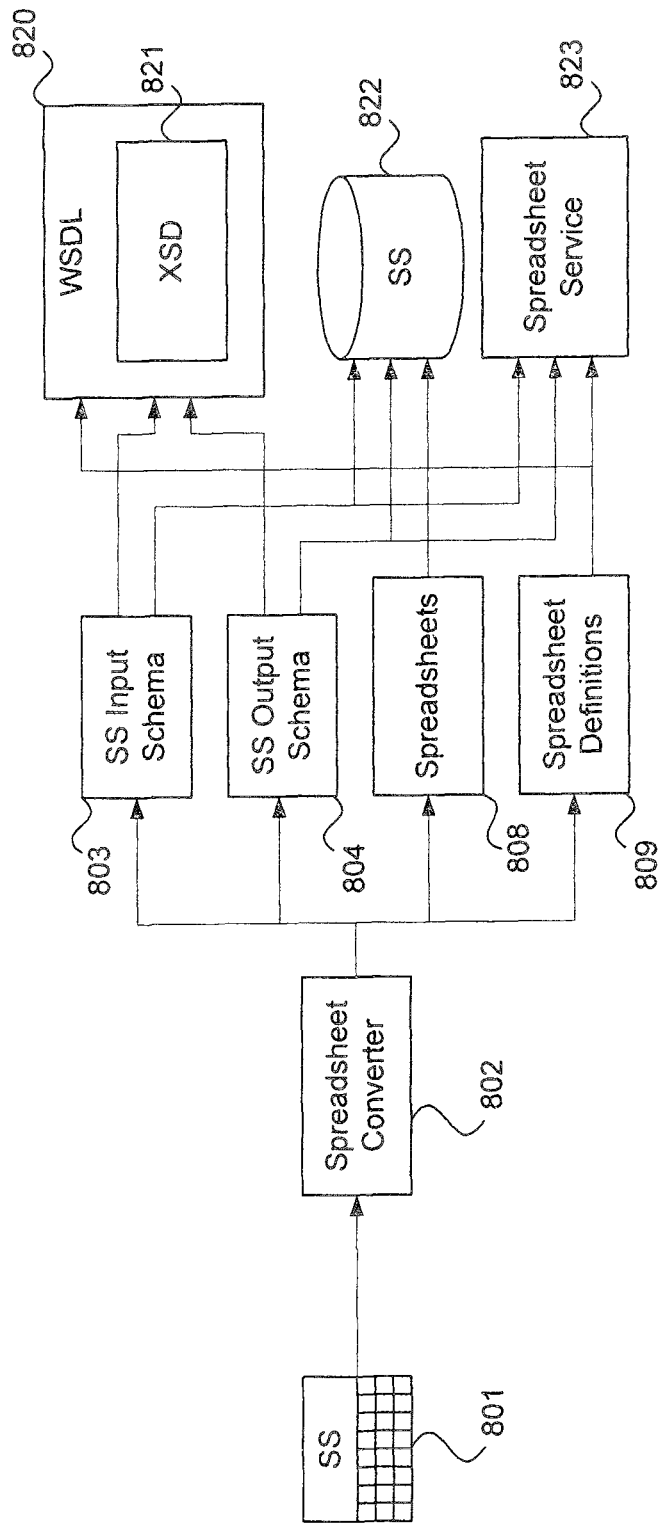

FIGS. 8A-B illustrate software constructs used to create spreadsheet services according to different embodiments of the present invention. For example, in FIG. 8A, a spreadsheet 801 may be analyzed by spreadsheet converter 802. In this example, the raw data cells may be used to generate one or more spreadsheet input schemas 803 ("SS Input Schema"). If the service is accessed to process new data using the functionality embedded in spreadsheet 801, the schema of the raw data in spreadsheet 801 may be used as the input schema of the spreadsheet. Similarly, output data cells, which may be derived from raw data cells, may be analyzed to generate one or more output schemas 804 ("SS Output Schema"). It is to be understood that particular outputs may be mapped to particular inputs so that the output receives all the inputs required to generate the output. Accordingly, a user may specify a desired output and the system may automatically generate both the input and output schemas. The input and output schemas 803 and 804, in turn, may be included as schemas in an XSD 821 and WSDL 820, for example. Additionally, the input and output schemas may be used in the spreadsheet service 823 for specifying code inputs and outputs or data queries, for example.

In other embodiments, raw data in spreadsheet 801 may be provided to users through the spreadsheet software service. Accordingly, spreadsheet converter 802 may extract data 805 from spreadsheet 801 and store the data in repository 822. Schemas 803 and 804 may be used to define how the data is stored. For example, spreadsheet input and output schemas may include metadata describing column names or rows. For instance, a row may include a cell that describes the information in the row or a column may include a cell that describes the information in the column. Arrays of data may be analyzed and such metadata may be extracted for use in configuring the data repository, the service inputs and outputs, and/or the service interface descriptions. Furthermore, raw data cells may be associated with both input and output schemas to allow users of the spreadsheet service to supply new data sets and receive the raw data if requested.

In the example illustrated in FIG. 8A, logic definitions 806 and logic 807 may also be extracted from spreadsheet 801. For example, if a particular output cell in spreadsheet 801 is functionally related to other cells, the logic to implement the function and a description of the function may be extracted and implemented as source code, for example, in spreadsheet service 823. Additionally, logic definitions may be used as "operations" in the service description, as described in more detail below, or used to set the naming conventions in the implementation of the logic (e.g., the name of a particular method implementing the function).

FIG. 8B illustrates an alternative embodiment of the present invention. In this example, spreadsheet 801 is analyzed by spreadsheet converter 802 to produce input schema 803, output schema 804, and spreadsheet definitions 809. Schemas 803 and 804 may be used as described above in FIG.

8B. In this example, the spreadsheets files 808 (e.g., .xls files) are stored in repository 822. Spreadsheet definitions 809 are used to bridge the service interface layer and spreadsheet program used to access the spreadsheets in repository 822. For example, the spreadsheet definitions may include the name of a particular spreadsheet (e.g., a Workbook name or Worksheet name). Spreadsheet definitions 809 may include a variety of information used for accessing the spreadsheet functionality through the spreadsheet programs API. For example, if the spreadsheet is an Excel® spreadsheet, any information that may be in the spreadsheet and useful for manipulating the spreadsheet using any Excel Object may be extracted and included in the spreadsheet definitions. The spreadsheet definitions and schemas, in turn, may be in interface code generated by spreadsheet converter 802 to implement the interface in the spreadsheet service 823.

EXAMPLE

FIG. 9 is an example Excel® spreadsheet that may be converted to a spreadsheet software service according to another embodiment of the present invention. Spreadsheet 900 includes raw data and derived data for analyzing the sales of a single product line of an organization (i.e., Alpha Product Line Sales). This example product line include eleven (11) products (i.e., Product 1000-1010), which are rows 920 in a table. Sales data in units sold is included for four (4) different regions (i.e., North America Sales, Europe Sales, Asia Sales, and S. America Sales), which are the columns 902-905 in the table. The raw data in the table represents the units sold by product by region. Accordingly, when this spreadsheet is converted into a spreadsheet service, the information in column 901 and rows 920 may be used as row descriptions. Similarly, the information in row 907 columns 902-905 may be used as column descriptions. The types associated with the data may also be extracted (e.g., integers). This information may be included in the schemas for the sales data, and the raw data stored in a database, for example Row 908 aggregates the sales by product to give the total sales in units for each region. Cells 921-924 include functions for calculating the cell values. For example, cell 921 includes the following function:

=SUM($B4:B14$), which sets the value of the cell equal to the sum of the raw data values in the cells in column 902. Similar programming is used to sum the sales in cells 922-924. When the spreadsheet is analyzed, the function in cell 922 may be converted into the following logic:

output_1=$a1+a2+\ldots+a11$.

It is to be understood that a variety of code implementations may be used to implement the functional logic of any cell based on examining the cell function and implementing the cell function in code. In this example, cells 922-924 perform similar functions for aggregating the sales in columns 903-905 so that total sales by region may be obtained. In a similar manner, the revenue for each regions sales may be obtained by operating on the values in cells 921-924. Column 909 includes the "Revenue". Cell 931 is programmed with the following to calculate revenue:

=$B16*2.5$

This programming may have been done by a sales analyst in Alpha Product Line with the knowledge that each unit sells for a price of $2.50, and the revenue equals the total units sold multiplied times the prices. Accordingly, in this example cells 931-934 are derived from the calculated values in cells 921-924. After analysis, the logic generated may be as follows:

output_2=output_1*2.5.

Similar logic may be used to represent the results for cells 932-934. At row 910, the total revenue may be calculated in cell 911 using the following:

=SUM($B17:E17$).

The above programs cell 911 to be the sum of cells 931-934, thereby giving the total revenue. Likewise, this programming may be analyzed (e.g., by parsing) and implemented in logic for use in a spreadsheet software service.

Any one of the cells in spreadsheet 900 may be provided to a user as an output. In one embodiment, the entire sheet may be an object provided to a user in response to a SOAP message (e.g., "getAlphaProductLineSales"), for example. In one embodiment, only the total revenue may be an output, and the output of the spreadsheet service may be the total revenue using logic for deriving the total revenue from the base data values (e.g., using the data in the spreadsheet or other data). In another embodiment, all of the derived data are outputs. In yet another embodiment, the spreadsheet service may be passed an array of data values matching the input schema of spreadsheet 900 and return any of the above outputs.

The following are examples of XSD and WSDL that may be used to implement a SOAP interface for a spreadsheet service using information from a spreadsheet. The following represents an XSD that is imported into a WSDL document for a spreadsheet service that returns total revenue for a product line specified by the product lines ID.

```
XSD
<xsd:schema xmlns:xsd = "http://www.w3.org/2001/XMLSchema"
    targetNamespace = "http://www.sap.com/example/path"
    <xsd:element name = "BusinessUnitRevenueRequestType">
        <xsd:complexType>
            <xsd:sequence>
                <xsd:element name = "BusinessUnitID" type = "xsd:integer"/>
            <xsd:sequence>
        <xsd:complexType>
    <xsd:element>
    <xsd:element name = "BusinessUnitRevenueReponseType">
        <xsd:complexType>
            <xsd:sequence>
                <xsd:element name = "BusinessUnitID" type = "xsd:string"/>
                <xsd:element name = "TotalRevenue" type = "xsd:decimal"/>
            <xsd:sequence>
        <xsd:complexType>
    <xsd:element>
xsd:schema>
WSDL
<definitions name="AlphaBusinessUnitFinancials"
    targetNamespace="http://www.sap.com/example/alphabusinessunit/wsdl/"
```

```
xmlns="http://schemas.xmlsoap.org/wsdl/"
xmlns:fin="http://www.sap.com/example/alphabusinessunit/schema/finance/"
xmlns:soap="http://schemas.xmlsoap.org/wsdl/soap/"
xmlns:xsd="http://www.w3.org/2001/XMLSchema">
 <types>
   <xsd:schema targetNamespace =
      "http://www.sap.com/example/alphabusinessunit/schema/">
      <xsd:import namespace =
         "http://www.sap.com/example/alphabusinessunit/schema/finance/"
         schemaLocation = "AlphaBusinessUnitFinancials.xsd"/>
   </xsd:schema>
 </types>
 <message name="getTotalRevenueRequestMessage">
   <part name="RequestParameter" element =
      "fin: BusinessUnitRevenueRequestType"/>
 </message>
 <message name="getTotalRevenueResponseMessage">
   <part name="ResponseParameter" element =
      "fin: BusinessUnitRevenueResponseType"/>
 </message>
 <portType name="AlphaBusinessUnitInterface">
   <documentation>
      GetTotalRevenue uses the Alpha Business Unit ID value to retrieve the
      Total Revenue value from the Alpha Business Unit Spreadsheet.
   </documentation>
   <operation name="GetTotalRevenue">
      <input message="fin:getotalRevenueRequestMessage"/>
      <output message="fin:getotalRevenueResponseMessage"/>
   </operation>
 </portType>
 <binding name="AlphaBusinessUnitFinancialsBinding" type =
 "fin:AlphaBusinessUnitInterface">
 <soap:binding style="document" transport="http://schemas.xmlsoap.org/soap/http"/>
   <operation name="GetTotalRevenue">
      <soap:operation soapAction="http://www.sap.com/example/soapaction"/>
         <input>
            <soap:body use="literal"/>
         </input>
         <output>
            <soap:body use="literal"/>
         </output>
   </operation>
 </binding>
 <service name="AlphaBusinessUnitFinancialsService">
 <port binding="fin:AlphaBusinessUnitFinancialsBinding"
    name = "AlphaBusinessUnitFinancialsPort">
    <soap:address location=" http://www.sap.com/example/alphabusinessunit"/>
 </port>
 </service>
</definitions>
```

From the above example it can be seen that one or more functions of a spreadsheet may be mapped to request and response messages in the WSDL definitions. Accordingly, a SOAP message may request access to the functionality by sending a request corresponding to one or more functions. In response to the request, the spreadsheet service will send back the information in a response. While the above example illustrates requesting a single output derived from spreadsheet functions (e.g., calculating total revenue) and data (e.g., the total revenue is based on data in the service), it is to be understood that other types of request and response messages could be used. For example, a request message may correspond to multiple outputs (e.g., getProductLineRevenueByRegion) and the response may include the results for each output (e.g., Total Revenue, North America, etc. . . . ). Additionally, the output may be a single complex object representing an entire spreadsheet page, workbook, or any combination of desired outputs. Accordingly, the outputs available in a spreadsheet may be mapped to input and output messages for use in the service. As another example, a request message may include data to be processed (or equivalently a link to such data). Accordingly, the request message may include a simple or complex schema for representing the data.

Figure 10:
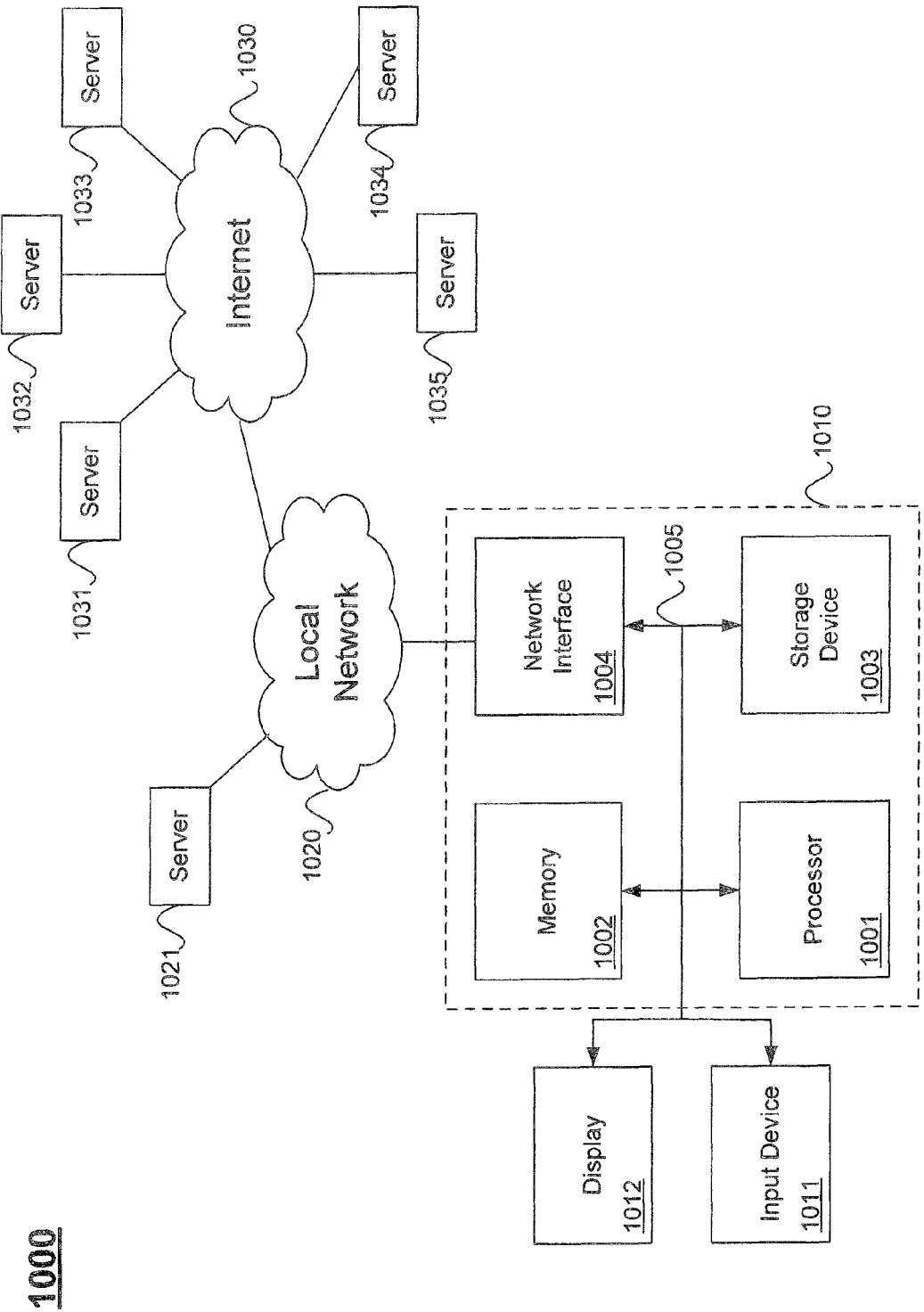
FIG. 10 illustrates an example network and computer system that may be used to implement embodiments of the present invention.

FIG. 10 illustrates an example network and computer system that may be used to implement embodiments of the present invention. Computer system 1010 includes a bus 1005 or other communication mechanism for communicating information, and a processor 1001 coupled with bus 1005 for processing information based on instructions in a computer program. Computer system 1010 also includes a memory 1002 coupled to bus 1005 for storing information and instructions to be executed by processor 1001, including instructions for performing the techniques described above. This memory may also be used for storing temporary variables or other intermediate information during execution of instructions to be executed by processor 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD, a DVD, a flash memory, a USB memory card, or any other medium from which a computer can read.

Computer system 1010 may be coupled via the same or different information bus, such as bus 1005, to a display 1012, such as a cathode ray tube (CRT) or liquid crystal display (LCD), for displaying information to a computer user. An input device 1011 such as a keyboard and/or mouse is coupled to a bus for communicating information and command selections from the user to processor 1001. The combination of these components allows the user to communicate with the system.

Computer system 1010 also includes a network interface 1004 coupled with bus 1005. Network interface 1004 may provide two-way data communication between computer system 1010 and the local network 1020. The network interface 1004 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1004 sends and receives electrical, electromagnetic, or optical signals that carry digital data streams representing various types of information.

Computer system 1010 can send and receive information, including messages or other interface actions, through the network interface 1004 to an Intranet or the Internet 1030. In the Internet example, software components or services, such as spreadsheet services, may reside on multiple different computer systems 1010 or servers 1031 across the network. A spreadsheet may be stored on computer system 1010, converted to a spreadsheet service using software on computer system 1010, and the output service sent to a server, for example. Accordingly, spreadsheet software services described above may be implemented on one or more servers. A server 1031 may also transmit messages from one service, through Internet 1030, local network 1020, and network interface 1004 to a service on computer system 1010, for example. Spreadsheet software services may be implemented on the same system as other spreadsheets or services, or on a different machine than other software components. This process of sending and receiving information between software spreadsheet software services may be applied to communication between computer system 1010 and any of the servers 1031 to 1035 in either direction. It may also be applied to communication between any two servers 1031 to 1035.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of generating a spreadsheet software service comprising:
   analyzing a spreadsheet to extract an output schema corresponding to at least a portion of the spreadsheet;
   generating a spreadsheet software service based in part on the extracted output schema, the spreadsheet software service configured to provide access to data in the spreadsheet, wherein the spreadsheet software service is accessible over a network;
   generating a software service interface description of a software service interface associated with the spreadsheet software service, wherein the software service interface is used to access the service; and
   storing the software service interface description in a repository comprising a plurality of software service interface descriptions, the repository connected to the network;
   the spreadsheet software service configured to provide access to data in the spreadsheet without using a spreadsheet program that was used to create the spreadsheet.

2. The method of claim 1 wherein the software service interface description is contained in a WSDL document, and comprises information about how the spreadsheet software service can be called.

3. The method of claim 1 wherein analyzing comprises generating an XSD document.

4. The method of claim 1 further comprising extracting data from said spreadsheet and storing the data with said software service.

5. The method of claim 4, further comprising
   configuring said data according to data schema information extracted from the spreadsheet; and
   accessing first data derived from said data by using the extracted output schema.

6. The method of claim 1 further comprising:
   receiving a SOAP request corresponding to the software service interface description in said software; and
   generating a SOAP response comprising data.

7. The method of claim 6 wherein the SOAP request comprises data, and wherein said data is processed by said software service according to logic in said spreadsheet, and wherein said SOAP response comprises the processed data.

8. The method of claim 6 wherein the SOAP request comprises a request for data, and wherein the software service queries data from the spreadsheet and the SOAP response comprises output data from the spreadsheet.

9. The method of claim 1 further comprising specifying a business process definition, wherein the business process definition accesses the functionality of at least one spreadsheet using the software service interface description.

10. The method of claim 1, further comprising
    extracting input schema for raw data of said spreadsheet;
    receiving new raw data;
    processing the new raw data by using logic associated with said input schema; and
    providing results of such calculations.

11. A non-transitory computer-readable medium containing instructions for controlling a computer system to perform a method, the method comprising:
    analyzing a spreadsheet to extract an output schema corresponding to at least a portion of the spreadsheet;
    generating a spreadsheet software service based in part on the extracted output schema, the spreadsheet software service configured to provide access to data in the spreadsheet, wherein the spreadsheet software service is accessible over a network;
    generating a software service interface description of a software service interface associated with the spreadsheet software service interface, wherein the software service interface is used to access the service; and
    storing the software service interface description in a repository comprising a plurality of software service interface descriptions, the repository connected to the network;
    the spreadsheet software service configured to provide access to the data in the spreadsheet without using a spreadsheet program that was originally used to create the spreadsheet.

12. The computer-readable medium of claim 11 wherein the software service interface description is contained in a WSDL document, and comprises information about how the spreadsheet software service can be called.

13. The computer-readable medium of claim 11 wherein analyzing comprises generating an XSD document.

14. The computer-readable medium of claim 11 further comprising instructions for controlling the computer system to performs steps of extracting data from said spreadsheet and storing the data with said software service.

15. The computer-readable medium of claim 14 further comprising instructions for
configuring said data according to data schema information extracted from the spreadsheet; and
accessing first data derived from said data by using the extracted output schema.

16. The computer-readable medium of claim 11 further comprising instructions for controlling the computer system to perform steps of:
receiving a SOAP request corresponding to the software service interface description in said software; and
generating a SOAP response comprising data.

17. The computer-readable medium of claim 16 wherein the SOAP request comprises data, and wherein said data is processed by said software service according to logic in said spreadsheet, and wherein said SOAP response comprises the processed data.

18. The computer-readable medium of claim 16 wherein the SOAP request comprises a request for data, and wherein the software service queries data from the spreadsheet and the SOAP response comprises output data from the spreadsheet.

19. The computer-readable medium of claim 11 further comprising instructions for controlling the computer system to perform steps of specifying a business process definition, wherein the business process definition accesses the functionality of at least one spreadsheet using the software service interface description.

20. The computer-readable medium of claim 11 further comprising instructions for
extracting input schema for raw data of said spreadsheet;
receiving new raw data;
processing the new raw data by using logic associated with said input schema; and
providing results of such calculations.

* * * * *